United States Patent [19]

Conkey

[11] Patent Number: 4,718,769

[45] Date of Patent: Jan. 12, 1988

[54] DOUGH PREPARATION APPARATUS

[75] Inventor: Ronald J. Conkey, Victoria, Tex.

[73] Assignee: Domino's Pizza, Inc., Ann Arbor, Mich.

[21] Appl. No.: 906,387

[22] Filed: Sep. 12, 1986

[51] Int. Cl.[4] .................................................. B29B 1/06
[52] U.S. Cl. ........................................ 366/69; 29/110.5
[58] Field of Search ................. 366/69, 348, 349, 342, 366/343; 29/110.5, 121.1, 121.2, 121.5, 121.6, 125

[56] References Cited

U.S. PATENT DOCUMENTS

| | | |
|---|---|---|
| 534,460 | 2/1895 | Wolff et al. . |
| 550,337 | 11/1895 | Wolff et al. . |
| 730,124 | 6/1903 | Hugunin et al. . |
| 819,772 | 5/1906 | Latham . |
| 1,158,111 | 10/1915 | Ahlheim ............................ 29/110.5 |
| 1,807,009 | 5/1931 | Pinnelli . |
| 4,224,726 | 9/1980 | Walker ................................. 29/121.1 |
| 4,439,904 | 4/1984 | Hoopengardner et al. ....... 29/110.5 |

OTHER PUBLICATIONS

"Dough Dockers" by Debra Newton, *Pizza Today*, Nov. 1986, pp. 124, 126 and 128.

Primary Examiner—Robert W. Jenkins
Attorney, Agent, or Firm—Beaman & Beaman

[57] ABSTRACT

Dough preparation apparatus of the "dough docker" type consisting of a shaft having a central region upon which a plurality of individual rollers are mounted in side-by-side relationship defining a roller stack. Radially extending teeth are defined upon each roller, and a gauging roller is mounted at each end of the stack of a diameter slightly greater than that of the stack rollers. Tubular sleeves are rotatably mounted upon the shaft end regions defining handles, and bolts threaded into the shaft ends maintain the assembly of components.

14 Claims, 5 Drawing Figures

2

DOUGH PREPARATION APPARATUS

BACKGROUND OF THE INVENTION

In the preparation of dough, such as pizza dough, it is of advantage to knead and deaerate the dough, and various dough preparation apparatus has been proposed utilizing a variety of configurations for such purposes, typical examples being shown in U.S. Pat. Nos. 550,337; 730,124; 819,772 and 1,807,009.

Devices known as "dough dockers" may be used in the preparation of pizza dough for kneading and deaerating purposes and such apparatus is of the rolling pin type having radially extending teeth or projections for working and indenting the dough in a predetermined manner to aid in the removal of air. Rolling pin type apparatus pushes and stretches the dough, and when the apparatus includes teeth or projections extending into the dough inconsistencies in the kneading and deaerating process will occur if the operator is not careful to insure an equal extent of lateral rolling pin movement throughout the length of the apparatus during dough working. If one end of the rolling pin rotates faster than the other end, an unequal stretching of the dough will occur which may cause a tear or other imperfection.

When kneading and deaerating dough, optimum results are achieved by closely regulating the depth of dough penetration by the deaerating teeth or projections, and it is known to use gauging rollers with rolling pin type devices to control the thickness of the dough, or the distance of the rolling pin surface from the support surface, typical examples of such apparatus being shown in U.S. Pat. Nos. 534,460; 4,435,145 and 4,521,174.

However, previous dough processing apparatus of the dough docker type has not successfully overcome the problems of producing consistent deaeration and dough working without producing tears and other dough imperfections while maintaining a uniform dough thickness and depth of penetration for deaeration purposes.

It is an object of the invention to provide dough preparation apparatus capable of kneading and deaerating dough in a consistent manner wherein uniform working and deaerating of the dough is achieved without requiring special skills by the operator.

A further object of the invention is to provide dough preparation apparatus of an economical construction which consists of a plurality of dough kneading and deaerating rollers each individually rotatably mounted upon a shaft and capable of rotating at that rate which will most advantageously work the dough contacted thereby.

Yet another object of the invention is to provide dough preparation apparatus of economical construction and manufacture which may be readily assembled, is easy to clean and maintain, and will consistently deaerate dough to a predetermined depth under uniform rolling and working conditions.

In the practice of the invention the dough preparation apparatus of the dough docker type includes a plurality of components mounted upon a cylindrical shaft. The shaft includes a central region upon which a plurality of independently rotatable rollers are mounted in side-by-side relationship to form an elongated stack. Each roller includes a plurality of radially extending teeth adapted to penetrate the dough mass being worked. Adjacent each end of the stack a gauging roller of slightly greater diameter than that of the stack rollers engages the surface supporting the dough and determines the depth of roller teeth penetration.

Tubular sleeves mounted upon the shaft end regions abut against the outer sides of the gauging rollers and define handles easily grapsed by the operator. The outer ends of the sleeves are engaged by washers mounted on bolts threaded into holes formed in the shaft ends and the bolts maintain the assembly of the components upon the shaft.

The rollers constituting the stack are independently rotatably mounted upon the shaft and if one end of the shaft is laterally pushed faster or further than the other, or the apparatus is moved through a slight arc, the resulting differences in the rate of roller rotation does not produce an uneven stretching or stressing of the dough in that each roller will automatically adapt itself to the rate of rotation commensurate with the rate of movement of the apparatus at each particular roller location, and accordingly, the apparatus automatically adapts itself to any inconsistency in the operator's handling of the apparatus during use.

Preferably, the rollers of the stack, the gauging rollers, and the handle sleeves, are all formed of a synthetic plastic material which is noncorrosive, easy to clean, and tends to release the dough therefrom. The teeth defined on the rollers of the stack are of a truncated pyramidal configuration which aid in releasing the dough, and apparatus in accord with the invention may be readily utilized by unskilled operators to achieve high quality dough kneading and deaeration without producing imperfections in the dough.

BRIEF DESCRIPTION OF THE DRAWINGS

The aforementioned objects and advantages of the invention will be appreciated from the following description and drawings wherein.

DESCRIPTION OF THE PREFERRED EMBODIMENT

Figure 1:
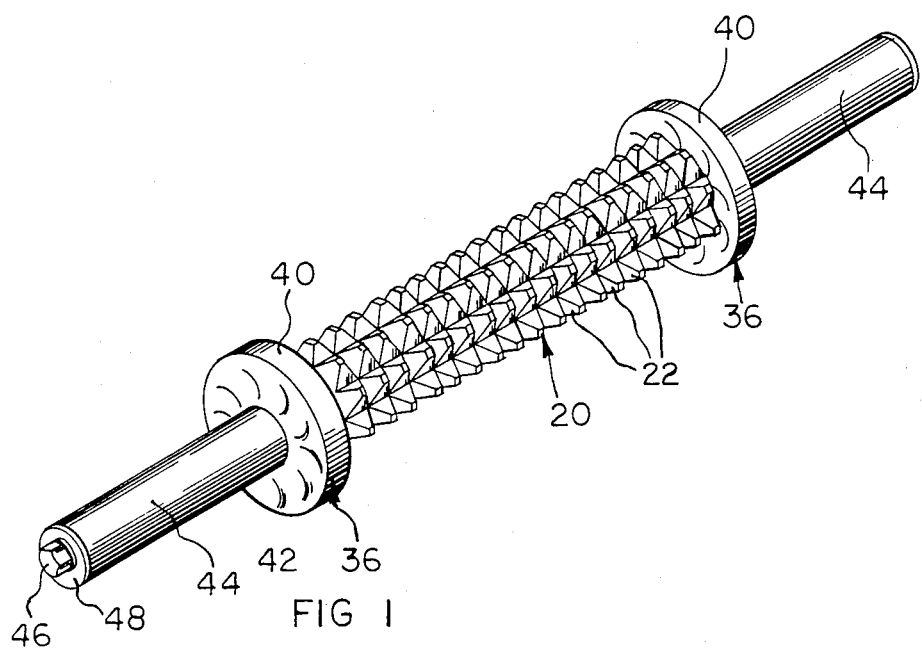
FIG. 1 is a perspective view of dough preparation apparatus in accord with the invention.
Figure 2:
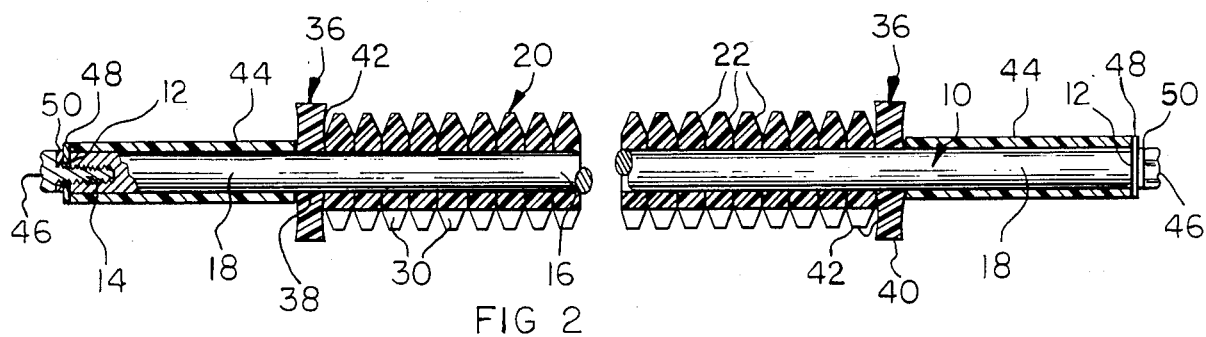
FIG. 2 is an elevational, diametrical, sectional view of the apparatus.

The general arrangement of the components of dough preparation apparatus in accord with the invention is best appreciated from FIGS. 1 and 2. An aluminum shaft 10 is of a uniform cylindrical diameter throughout its length, and at its ends 12 is provided with coaxial threaded holes 14. The shaft includes a central region 16 and axially extending end regions 18 adjacent each shaft end 12.

Figure 3:
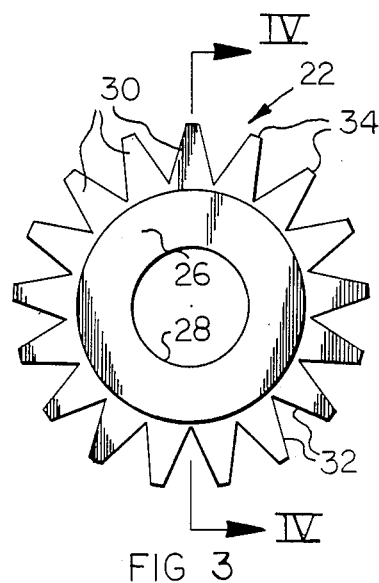
FIG. 3 is a side, elevational view of a stack roller, per se, prior to mounting on the shaft.
Figure 4:
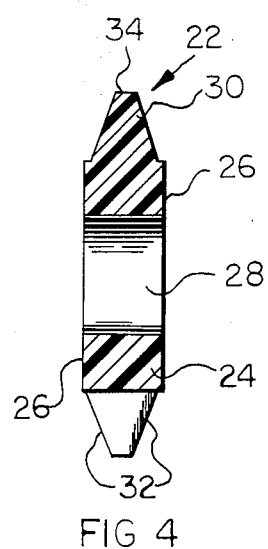
FIG. 4 is an elevational, sectional view taken along Section IV—IV of FIG. 3.

The shaft central region 16 supports a roller stack, generally indicated at 20, which consists of a plurality of individual rollers 22 each separately rotatable upon the shaft. The rollers 22 are formed of a synthetic plastic material, such as nylon, and include a hub region 24, FIGS. 3 and 4, axially defined by flat lateral sides 26 which are intersected by axial bore 28 which is slightly greater in diameter than shaft 10. The periphery of the rollers 22 is defined by a plurality of pyramidal truncated teeth 30 formed by outwardly converging sides 32 terminating in a blunt end 34, which formed the outer diameter of the rollers. The configuration of the teeth 30 is such as to work and knead the dough to eliminate entrapped air, and to minimize the dough adhering to the teeth. In the commercial version of the apparatus, thirty rollers 22 are utilized, having an axial width of approximately one half inch and a diameter of approximately 2-⅜".

The ends of the roller stack 20 are defined by the outer lateral sides 26 of the endmost rollers 22, and a gauging roller 36 engages each of these end stack rollers. The gauging rollers 36 are formed of a synthetic plastic material, such as nylon, and include an internal bore 38 permitting the rollers to be rotatably mounted upon the shaft 10. The outer periphery 40 of the rollers 36 is cylindrical, and is of a diameter slightly greater than the diameter of the rollers 22.

Figure 5:
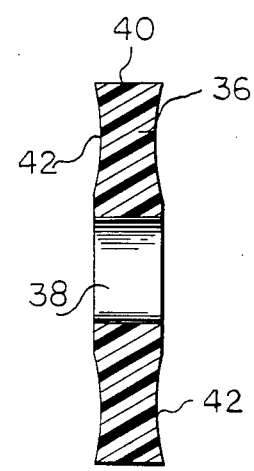
FIG. 5 is a diametrical, elevational, sectional view as taken through a gauging roller.

As will be appreciated from FIG. 5, the inner and outer lateral sides of the gauging rollers 36 are each provided with an annular recess 42 of concave form whereby the minimum axial thickness of the gauging rollers is between the bore 38 and periphery 40.

A tubular synthetic plastic sleeve 44 is mounted upon each end region 18 of the shaft 10 between the adjacent gauging roller 36 and the adjacent shaft end 12. The sleeves 44 have an internal diameter slightly greater than that of the shaft 10 as to be freely rotatably mounted thereon. The inner end of the sleeves engage the outer surface of the gauging rollers 36 adjacent the shaft 10, and the outer ends of the sleeves substantially align with the shaft ends 12.

Bolts 46 threaded into the shaft holes 14 extend through a stainless steel washer 48, and a stainless steel spring washer 50. The washer 48 is of sufficient diameter to axially align with the adjacent sleeve 44, and abut against the sleeve end, and in this manner, the bolts 46 and washers 48 axially locate the sleeves upon the shaft 10 and maintain the entire assembly of the dough preparation apparatus. The entire length of the shaft 10 is slightly greater than the assembled axial length of the rollers 22, rollers 36 and sleeves 44, when contiguous, so that tightening of the bolts 46 permits the rollers and sleeves to readily rotate upon the shaft, but axial play of these components on the shaft is slight.

In use, the dough to be worked is placed upon a flat surface in the known manner, and the dough is kneaded by the stack rollers 22. The periphery of the gauging rollers 36 will engage the flat support surface for the dough and maintain the shaft 10 parallel to the support surface at a predetermined distance therefrom. As the apparatus is passed back and forth over the dough, the roller teeth 30 will penetrate the dough producing a plurality of depressions, and as the diameter of the gauging rollers 36 is greater than that of the rollers 22, the depressions will not pass entirely through the dough. This working of the dough will remove entrapped air therefrom.

As each roller 22 will rotate at that rate determined by the resistance provided by the dough encountered, a consistent working and streching of the dough by the apparatus is achieved throughout the length of the stack 20 regardless of whether the velocity of movement of one end of the apparatus is slightly greater or less than the other end. As the rate of rotation of each roller 22 is thereby automatically determined, uneven stresses or stetching of the dough, as would occur if all of the rollers 22 were interconnected and rotated in unison, is eliminated reducing the likelihood of imperfections in the finished product.

By the utilization of noncorrosive components, cleaning of the apparatus is simplified and by making the rollers 22 and 36 of self-lubricating nylon, the tendency for the dough to adhere thereto is reduced as compared with using metal components. Also, due to the recesses 42 on the inner side of the rollers 36, sufficient clearance exists between the rollers 36 and the adjacent teeth 30 to reduce the likelihood of dough being trapped therebetween.

It is appreciated that various modifications to the invention may be apparent to those skilled in the art without departing from the spirit and scope of the invention, and the invention is intended to be defined only by the following claims.

I claim:

1. Dough preparation apparatus for kneading and rolling dough characterized by its uniformity of kneading comprising, in combination, a shaft having an axially extending central region, axially extending end regions and ends defining the terminus of said end regions, a plurality of rollers mounted upon said shaft central region for separate and individual rotation thereon together defining a roller stack having ends, each of said rollers including a periphery and lateral sides, dough kneading means defined upon said periphery of said rollers, a circular gauge roller rotatably mounted upon each shaft end region located adjacent a roller stack end having a diameter slightly greater than the diameter of said rollers, said shaft end regions defining handles whereby said rollers may be rolled over dough to be prepared.

2. Dough preparation apparatus as in claim 1 wherein said lateral sides of adjacent rollers engage and determine the axial spacing between adjacent rollers.

3. Dough preparation apparatus as in claim 2, the axial width of each roller periphery being less than the axial separation of said lateral sides of a roller.

4. Dough preparation apparatus as in claim 3, said dough kneading means defined upon said periphery of said rollers comprising a plurality of radially extending teeth.

5. Dough preparation apparatus as in claim 4, said rollers and teeth being homogeneously defined of a synthetic plastic material.

6. Dough preparation apparatus for kneading and rolling dough characterized by its uniformity of kneading comprising, in combination, a shaft having an axially extending central region, axially extending end regions and ends defining the terminus of said end regions, a plurality of rollers mounted upon said shaft central region for separate and individual rotation thereon together defining a roller stack, each of said rollers including a periphery and lateral sides, dough kneading means defined upon said periphery of said rollers, said shaft end regions defining handles whereby said rollers may be rolled over dough to be prepared, a tubular sleeve rotatably mounted upon each shaft end region forming a handle and fastening means mounted on said shaft ends engaging the adjacent sleeve to prevent axial movement of said sleeves over said shaft ends.

7. Dough preparation apparatus as in claim 6, a pair of gauge rollers rotatably mounted upon said shaft each having a circular periphery, a gauge roller being located between each sleeve and said roller stack, the diameter of said gauge rollers being greater than the diameter of said stack rollers.

8. Dough preparation apparatus as in claim 7, each of said gauge rollers including an inner lateral side disposed toward said roller stack, said gauge roller's inner lateral side being axially annularly recessed between said shaft and the associated gauge roller's periphery.

9. Dough preparation apparatus as in claim 8, said gauge rollers being formed of synthetic plastic.

10. Dough preparation apparatus for kneading and rolling dough characterized by its uniformity of kneading comprising, in combination, a shaft having an axially extending central region, axially extending end regions and ends defining the terminus of said end regions, a roller stack mounted upon said shaft central region having axially separated ends, said roller stack consisting of a plurality of individual rollers each rotatably mounted upon said shaft central region for separate rotation thereon and each roller including a periphery and lateral sides, dough kneading means defined upon the periphery of said rollers, a tubular sleeve rotatably mounted upon each shaft end region having an inner end and an outer end, retaining means mounted upon each shaft end engaging a sleeve outer end maintaining the associated sleeve upon the associated end region, a gauge roller rotatably mounted upon said shaft located between each roller stack end and the adjacent sleeve inner end, said gauge rollers each having a circular periphery and inner and outer sides, the diameter of said gauging rollers being slightly greater than the diameter of said roller stack rollers, said retaining means maintaining the assembly of said roller stack, said gauging rollers and said sleeves upon said shaft.

11. Dough preparation apparatus as in claim 10, said roller stack rollers, said gauging rollers and said sleeves being formed of synthetic plastic material.

12. Dough preparation apparatus as in claim 10, said dough kneading means mounted on the periphery of said stack rollers comprising a plurality of radially extending teeth.

13. Dough preparation apparatus as in claim 12, said lateral sides of adjacent stack rollers engaging each other, the axial width of each of said stack roller's periphery being less than the axial separation of said lateral sides of a roller.

14. Dough preparation apparatus as in claim 10, said ends of said roller stack being defined by a lateral side of a stack roller, said gauging rollers inner sides engaging the adjacent stack roller lateral side, said gauge rollers inner sides being axially annularly recessed between said shaft and said gauge roller periphery.

* * * * *